Patented May 20, 1947

2,420,884

UNITED STATES PATENT OFFICE 2,420,884

VARIABLE VOLTAGE MOTOR CONTROL SYSTEM

George E. King, Swissvale, and William H. Formhals, Forest Hills, Pa., assignors to Westinghouse Electric Corporation, East Pittsburgh, Pa., a corporation of Pennsylvania Application October 17, 1944, Serial No. 559,068

8 Claims. (Cl. 172—179)

1

The present invention relates to variable voltage control systems and, more particularly, to electric motor control systems for operating or automatically controlling the operation of motors connected to various types of mechanical loads. In certain of its aspects this invention is related to the copending applications of George E. King, Serial No. 559,065, filed on the same date as this application and entitled Control systems, to Serial No. 559,066, filed on the same date as this application and entitled Control systems, and to Serial No. 559,067, also filed on the same date as this application and entitled Control systems.

This invention provides certain improvements in variable voltage control systems in which rotating regulators are employed to regulate certain electrical quantities of the system, and the invention as hereinafter described and as illustrated in the drawings, is specifically directed to the regulation of the speed of rotation of a direct-current motor together with provisions for limiting the motor current whether the motor is operating normally as a motor or during regenerative periods when the motor is being overhauled by its mechanical load and driven as a generator. It will be apparent to one skilled in the art that the invention is not limited to speed regulation alone since various modifications of the system may be made to control the motor torque or power in conjunction with the current limiting features mentioned. It will further be apparent that the invention is not necessarily limited to motor control since automatic regulation of the voltage, current or electrical power supplied to an electrical load of substantially any type susceptible of regulation may be had.

In the single embodiment of the invention illustrated in the drawings the variable voltage control system is particularly adapted for controlling the speed of a motor used to drive a centrifugal casting machine. Such a machine usually has fixed running and creeping speeds. After the metal is poured into the mould to be rotated, the machine is accelerated, by way of example, in 15 minutes to the running speed, at which speed it may be operated for about 50 minutes. The machine is then decelerated and brought to rest in approximately a 10 minute interval of time. It is then again started and brought up to the creeping speed where it is operated for about 100 minutes after which it is again brought to rest and in due course of time the completed casting is removed.

The running speed of the centrifugal casting machine is preferably constant. Likewise the slow or creeping speed of the centrifugal casting machine is preferably constant. Thus speed regulation at these different speeds is essential. In the instant application such speed regulation is obtained by means of a rotating regulator. Current limiting control by means of a second rotating regulator is also provided to limit the accelerating and braking current. The rotating regulator used to control the motor speed is so connected that it circulates current through the field windings of the main generator supplying the motor. This current is circulated in such a direction with respect to the normal supply currents circulating in these fields that the current supply to the motor by the main generator is of a value which tends to maintain the preselected constant speed. The second rotating regulator mentioned which provides protection against excessive motor armature currents, modifies the control of the speed controlling rotating regulator. This current limiting regulator is operative to modify the action of the speed controlling rotating regulator on the system only during periods when the motor armature currents have exceeded a preselected maximum value. The combined actions of the two rotating regulators is such that the motor is always accelerated in the smallest interval of time that is possible without the motor armature current exceeding the preselected maximum value.

The creeping speed is very slow and may, for example, be about 1.2% of the full field speed of the main drive motor. Speed regulation of the motor at this slow speed is obtained in a manner similar to that at the running speed of the motor. Suitable control means, however, are provided to recalibrate the system to insure good stability of the rotating regulators under this new condition.

In order to simplify the drawings and the accompanying descriptive disclosure the form of the invention illustrated is shown without reversing facilities. Reversing may be obtained by simply adding reversing contactors. Such expedients are well known in the art and any suitable form of reversing equipment may be utilized without departing from the spirit and scope of the teachings of this invention.

A principal object of this invention is to provide a variable voltage drive including a motor in which automatic speed regulation of the motor is provided in conjunction with automatic regulation of the motor current.

Another object of this invention is to provide a variable voltage drive in which at least two selectively obtained constant running speeds for a motor are provided in conjunction with current limiting protection for the motor and in which one of these speeds is variable over a preselected speed range.

Still another object of this invention is to provide a variable voltage drive of the character referred to which provides a wide range of speed regulation for a motor in conjunction with protection against excessive motor currents.

A specific object of this invention is to provide a variable voltage drive utilizing rotating regulators for regulating the speed of a motor and limiting the motor current in which the rotating regulator controlling the motor currents has its electrical output effectively blocked over a certain range of motor currents by an oppositely applied potential of a preselected value.

Other objects and advantages will become apparent upon a study of the following disclosure when considered in conjunction with the accompanying drawings, in which.

Figure 1:
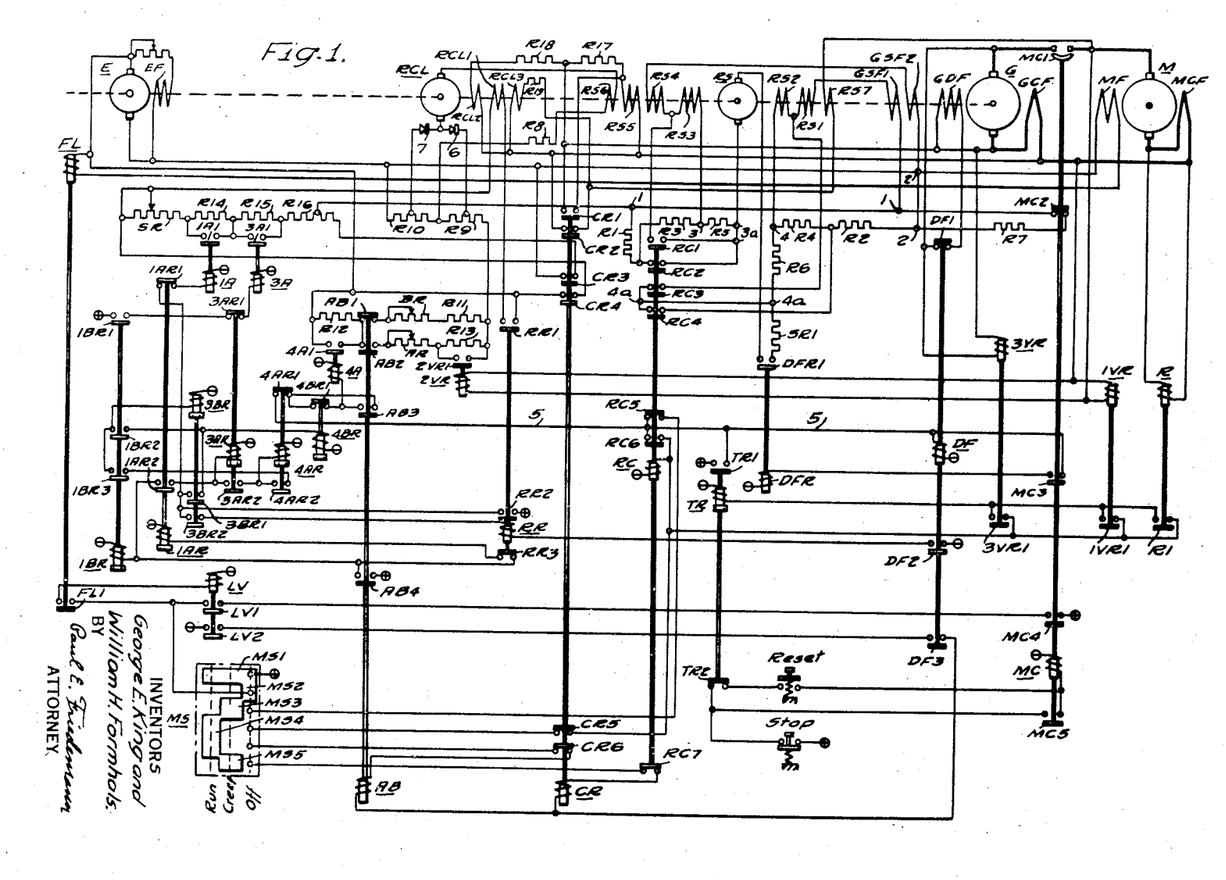
Figure 1 schematically illustrates a variable voltage drive providing protection against excessive currents in which constant speeds of the motor controlled by the variable voltage system are selectively obtained.

Referring now to Fig. 1 of the drawings, the invention illustrated therein comprises generally a main drive motor M which is mechanically connected to drive the mentioned centrifugal casting machine (not illustrated). The armature winding of this motor is connected in series with the armature winding of a main generator G. A speed regulating generator RS is utilized to control the electrical output of the main generator G. A current limiting regulating generator RCL is utilized to limit the current circulating in the series motor generator armature circuit within preselected maximum values. An exciter E is provided to supply a constant electrical quantity to various elements of the system. The exciter E, the current limiting regulator RCL, the speed regulator RS and the main generator G are driven at a constant speed by any suitable constant speed prime mover or system of prime movers. As shown by way of illustration but not limitation, these machines are connected to a common shaft to be driven by a single prime mover. The constant speed prime mover, however, is not shown in an effort to simplify the illustration of the invention.

The main motor M is provided with a control field winding MF and a series connected commutating field winding MCF.

The main generator G is provided with a commutating field winding GCF, also series connected. A differential field winding GDF is provided for the main generator and utilized at the end of braking periods of the motor to buckdown or neutralize the residual voltage of the main generator. This main generator is further provided with control field windings GSF1 and GSF2 which are connected, as more easily seen in Fig. 2, in opposite legs of a conventional Wheatstone bridge circuit.

Figure 2:
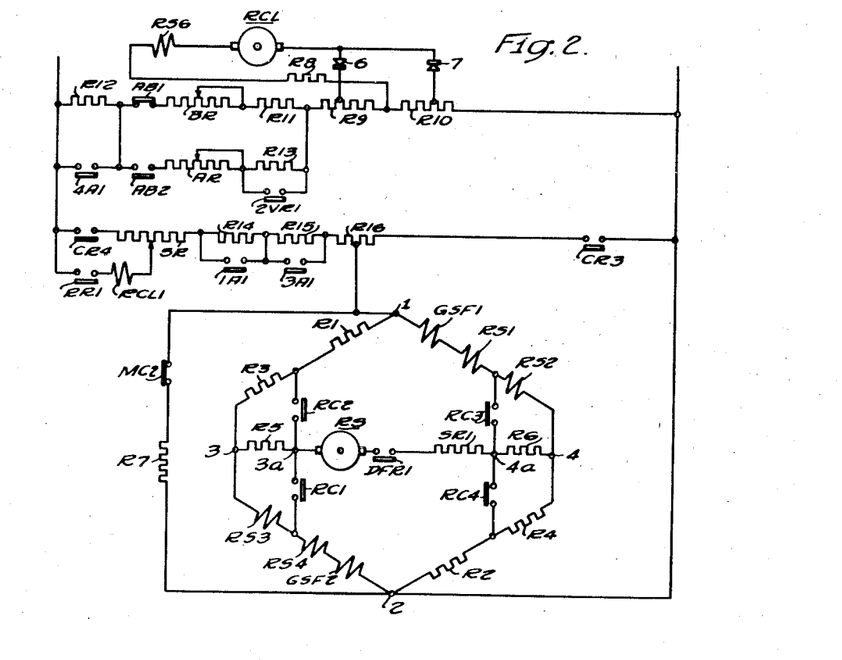
Fig. 2 diagrammatically illustrates the connections of the two rotating regulators and their associated elements in the system shown in Fig. 1.

The speed regulating generator RS is provided with a plurality of field windings. Of these windings, those designated RS1 and RS2 are connected in series with the main generator field winding GSF1 in one leg of the bridge, and those designated RS3 and RS4 are connected in series with the main generator field winding GSF2 in the opposite leg of the bridge circuit. The field winding RS5 for this machine is connected across the main generator commutating and differential field winding and is thus excited by a current proportional to that flowing through these field windings. The field winding designated RS6 is connected in series with the armature circuit of the current limiting regulating generator RCL. The field winding designated RS7 is connected in series with the winding RCL3 of the current limiting generator and the resistor R19 and this series circuit is connected across the motor armature terminals. These series elements are thus excited by currents proportional to the motor armature terminal voltage.

The current limiting regulating generator RCL is provided with three control field windings RCL1, RCL2 and RCL3. The winding designated RCL2 is connected in parallel with the winding RS5 of the speed regulating generator. The winding RCL1 under certain operating conditions is connected in series circuit with the speed controlling rheostat SR which in turn, through a group of series connected resistors, is connected to one input terminal of the electrical bridge circuit. The winding RCL3 as above noted is in series with the winding RS7. across the motor armature terminals. The windings RCL1 and RCL2 are additively connected and the winding RCL3 is differentially connected with respect to the windings RCL1 and RCL2.

The exciter E is provided with a single control field winding EF which is connected in shunt circuit with the exciter armature. This machine may be provided with any suitable field winding arrangement since per se it forms no part of this invention.

The control equipment which cooperatively functions to provide selectively obtained operations of the system, as well as functioning in part to protect the system, comprises a main contactor MC which is utilized to complete the series motor generator armature circuit in preparation for starting.

A field loss relay FL has its operating coil connected in series with the motor field winding MF and thus senses a loss of motor field.

A relay R has its coil connected across the motor commutating field MCF and is thus energized by the drop across this field winding.

Voltage relay 1VR has its coil connected across the motor armature terminals and is energized according to the voltage drop thereacross. This relay picks up when the voltage across the motor armature terminals is fairly low for example that corresponding to the creeping speed of the motor.

Voltage relay 2VR which, as shown, is connected in parallel with the relay 1VR is adjusted to pick up at some voltage across the motor armature terminals which corresponds to a low speed say 30% of top speed. This relay recalibrates the current limiting regulating generator to limit initial starting currents. This limits the starting torque of the motor to desirable values.

Voltage relay 3VR is energized by the voltage drop across the generator armature terminals.

Differential field relay DF is energized in an amount proportional to the exciter voltage. While this relay, as a number of other relays in this system, are not shown connected to the exciter, this is done to simplify the circuit arrangement illustrated. It will be understood that any suitable energizing potential for these relays is satisfactory. This differential field relay DF, when deenergized, connects the generator differential field GDF across the generator armature terminals thus neutralizing the generator residual voltage.

The relay DFR, energized by a suitable energizing potential as is the relay DF just mentioned, is utilized to connect the armature of the speed regulating generator RS across the output terminals of the Wheatstone bridge circuit.

Timing relay TR is provided to time the drop out of the differential field relay DF thus preventing premature application of the generator differential field GDF.

A running contactor RC is provided to recalibrate the electrical bridge circuit to obtain the selected running and creeping speeds of the motor.

A creep relay CR is provided to recalibrate certain of the field circuits of the speed regulating generator RS, to shunt the field RCL3 from its series connection with the field RS7 and at the same time to select the proper potential to be applied across the input terminals of the electrical bridge circuit during creeping operation of the motor.

A run relay RR is provided which functions alternately with the creep relay to provide the necessary control of the motor for the running speed thereof.

An accelerating and braking relay AB is provided to selectively obtain the desired accelerating and braking connections.

Sequentially operating accelerating relays 1AR, 3AR and 4AR, which function, respectively, in conjunction with the auxiliary accelerating relays 1A, 3A and 4A, are provided to control the accelerating currents supplied to the electrical bridge. Similarly, braking relays 1BR, 3BR and 4BR are provided to control the braking currents supplied to the electrical bridge.

A low voltage relay LV, which is preferably energized according to the exciter potential, is utilized to deenergize the AB and CR relays in the event that the exciter potential drops below a predetermined value.

A master switch MS is provided to control the CR and RR relays. In the creep position of this master switch the CR relay is energized and thus the motor is operated at creeping speeds. In the run position of this master switch the RR relay is eventually energized through the accelerating and braking relays and the motor is operated at its running speed.

The main contactor MC is provided with a plurality of contacts of which the contact MC1 is the main contact and is utilized to complete the motor generator series armature circuit. The back contact MC2 thereof is connected in series with a resistor R7 across the input terminals 1 and 2 of the electrical bridge circuit. This circuit when closed by the contacts MC2 in effect forms a discharge path for the field windings connected in the opposite legs of the electrical bridge. The contact members MC3 complete a partial energizing circuit for the relay DFR. The contact members MC4 complete a partial energizing circuit for the low voltage relay LV. The contact members MC5 shunt the "start" push button which is connected in series with the "stop" push button and the coil of this main contactor. These contacts thus form a holding circuit for the coil of this contactor.

The relay R is provided with a single contact R1 which, in part, forms an energizing circuit for the timing relay TR.

The voltage relay 1VR is provided with a single contact 1VR1 which shunts the contact R1 and also provides a partial energizing circuit for the timing relay TR.

The voltage relay 2VR is provided with a single contact 2VR1 which shunts the resistor R13 connected in series with the accelerating rheostat AR.

The voltage relay 3VR is provided with a single contact 3VR1 which is connected in shunt circuit with the previously mentioned 1VR1 and R1 contacts and, like these contacts, completes a partial energizing circuit for the timing relay TR.

The differential field relay DF has its back contact DF1 connected to complete the connection of the generator differential field winding GDF when this differential field relay is deenergized. The contact members DF2 partially complete a circuit for the coil of the run relay RR. Contact members DF3 partially complete energizing circuits for the creep relay CR and for the accelerating and braking relay AB.

The relay DFR is provided with a single contact DFR1 which connects the armature of the speed regulating generator RS across the output terminals of the electrical bridge circuit.

The timing relay TR is provided with a contact TR1 which is connected to a point of positive potential and the conductor 5. When closed this contact supplies a positive potential to the conductor 5 which is utilized to energize the relays DF, DFR and 4A. It also has a back contact TR2 which is connected in series with the "reset" push button. Thus when this contact is open operation of the "reset" push button does not energize the coil of the MC contactor. It is thus impossible to close the motor generator armature circuit if a voltage exists across the motor or generator armatures.

The run contactor RC is provided with a plurality of contacts numbered RC1 to RC7. The contacts RC1 and RC4 are utilized to shunt certain of the resistors and field windings from all four legs of the electrical bridge, and at the same time to shunt certain of the resistors connected in series with the armature of the speed regulating generator RS from the bridge. In other words this relay changes the calibration of the bridge circuit.

The creep relay CR is provided with a plurality of contacts designated CR1 to CR6. The contact members CR1 shunt the resistor R17 and thus change the calibration of the parallel connected field windings RS5 and RCL2. The contact members CR2 shunt the field winding RCL3 and its series resistor R19, thereby effecting energization of the field winding RS7 with the full voltage drop across the motor armature terminals and in effect disconnecting the winding RCL3 from the circuit. Contact members CR3, in conjunction with contact members CR4, connect the speed rheostat SR and its series connected resistors R14, R15 and R16 across the exciter terminals. At the same time the contact members CR3 connect a portion of the resistor R16 in shunt circuit relationship with the input terminals of the electrical bridge circuit. The bridge circuit is thus in effect energized by the voltage drop across the shunt connected portion of the resistor R16. The contact members CR5, which are back contacts, complete a partial energizing circuit for the coil of the run contactor RC. The back contact member CR6 completes a partial energizing circuit for the coil of the accelerating and braking relay AB.

The run relay RR is provided with the contacts RR1 to RR3. The contact RR1 connects the control field RCL1 for the current limiting regulating generator RCL in series with a selected portion of the speed rheostat SR. The contact members RR2 when closed supply positive potential to the accelerating and braking relays. The contact members RR3, when closed, partially complete an energizing circuit for the accelerating relay 1AR.

The accelerating and braking relay AB is provided with a plurality of contacts designated AB1 to AB4. The contact members AB1, which are back contacts, connect the resistor R12 in series with the braking rheostat BR and its series connected resistors R11, R9 and R10. Contact members AB2 function in part to complete the energizing circuit for the accelerating rheostat AR and its series resistor R13. The accelerating and braking rheostats and their associated resistors and contacts are connected in parallel relationship and this parallel circuit is connected in series with the resistors R9 and R10, across the exciter. The braking and accelerating rheostats are thus selectively connected to the resistors R9 and R10 by the contactors AB1 and AB2. The contact members AB3 function in part to complete an energizing circuit for the auxiliary accelerating relay 4A with the positive conductor 5. Contact members AB4 when closed supply positive potential to various of the relays in the accelerating and braking relay system and through this relay system energizes the RR relay.

The field loss relay FL is provided with a single contact FL1 which functions in part to form an energizing circuit for the low voltage relay LV.

Accelerating relay 1AR is provided with the back contacts 1AR1 and the front contacts 1AR2. The back contacts 1AR1 provide when closed a partial energizing circuit for the relay 1A. The contact members 1AR2, when closed, partially complete energizing circuits for various of the accelerating and braking relays.

Accelerating relay 3AR is energized upon closing of the contacts 1AR2. This relay has a back contact 3AR1 which partially completes an energizing circuit for the auxiliary relay 3A and front contacts 3AR2 which when closed pick up the relay 4AR.

Accelerating relay 4AR is provided with back contacts 4AR1 which partially connect the relay 4A to the positive conductor 5; and front contacts 4AR2 which when closed complete an energizing circuit to the contacts 1BR3 of the braking relay 1BR.

Accelerating relay 1A is provided with contact 1A1 which shunts the resistor R14 in the series circuit of the speed rheostat SR.

The relay 3A is provided with contacts 3A1 which shunt the resistor R15 also in series with the speed rheostat SR.

The relay 4A is provided with contacts 4A1 which shunt the resistor R12 which, depending upon the position of the relay AB, inserts or removes this resistor from a series circuit connection with either of the braking or accelerating rheostats BR or AR.

The low voltage relay LV is provided with the contacts LV1 and LV2. The contacts LV1 complete a partial holding circuit for this low voltage relay when they are closed, and the contacts LV2 function to complete partial energizing circuits for the creep relay CR and the accelerating and braking relay AB.

The master switch MS is provided with contacts MS1 to MS5. The contact MS1 is continuous through the "off," "creep" and "run" positions and is connected to a point of positive potential. The contact MS2 extends only through the "off" position. The contact MS3 extends only through the "creep" position. The contact MS4 extends only through the "run" position. The contact MS5 extends only through the "creep" position.

For operation of the system at running speed the contacts RC1 to RC4 are closed. Thus the resistor elements R3, R5 and the speed regulating generator field winding RS3 are shunted from one extremity of the bridge circuit, and one output terminal of the bridge is shifted from the point 3 to the point 3a. Similarly the resistors R4 and R6 and the speed regulating generator field winding RS2 are shunted from the other extremity of the bridge circuit, and thus the other output terminal is shifted from the point 4 to the point 4a. The bridge circuit thus includes the oppositely disposed field windings GSF1 and RS1, and GSF2 and RS4. The other two legs of the bridge circuit under these conditions comprise the resistors R1 and R2.

When the RC contactor is energized the RR relay is also energized. Thus the field winding RCL1 of the regulating generator RCL is connected in series with a portion of the speed regulating rheostat SR and is thus energized by the current flowing through this circuit. This establishes the pattern voltage for the running conditions for the current limiting regulating generator RCL. The creep contactor CR under these conditions is deenergized. Thus its contact members CR1 and CR2 are open. The field winding RS5 with its series resistor R17 is thus connected in parallel with the field winding RCL2 and its series resistor R18. Since the contact members CR2 are open, the field windings RS7 and RCL3 and the series resistor R19 are connected across the motor armature terminals. Thus both of these fields are energized.

For creeping operation of the control system the run contactor RC is deenergized and the contacts RC1 to RC4 thereof are open. This inserts the resistors R3 and R5 and the field winding RS3 and the resistors R4 and R6 and the field winding RS2. The bridge circuit for this slow speed of operation of the motor is thus recalibrated and the sensitivity of the speed regulating generator RS increased because of the increase in ampere turns of its field windings. The creeping relay CR for the slow speed is energized. Thus its contact CR1 shunts the resistor R17 and recalibrates the field RS5. Closure of the contact members CR2 shunts the field RCL3 of the speed regulating generator and its series resistor R19 and thus in effect removes this field from the system. At the same time the contact members CR3 and CR4, upon closing, recalibrate the circuit including the speed controlling rheostat SR and provide excitation for the bridge circuit only according to the drop across a portion of the resistor R10 connected in shunt circuit with the bridge.

Figure 3:
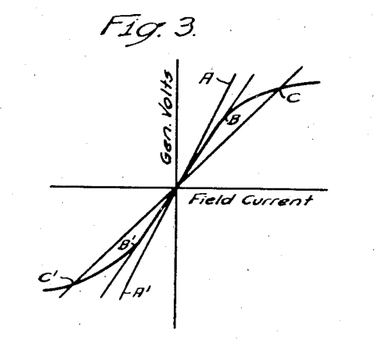
Fig. 3 is a curve graphically illustrating the operating characteristics of one of the rotating regulators utilized in this invention.

Before proceeding with a discussion relating to the operation of the system, an understanding of the characteristics of the regulating generator RS should be had. This generator is of the series type. In Fig. 3 of the drawings the saturation curve of a series generator is drawn. Stable operation of a series generator is obtainable only if the resistance lines of the field circuit is less than that of a line tangent to the initial substantially straight line portion of the saturation curve. If the resistance is higher, as indicated by the line A—A', the generator voltage cannot build up. If the resistance is lower, the generator voltage will be that determined by the intersection of the resistance line with the saturation curve, for example, points C—C'. If the resistance line is exactly tangent to this curve, the generator can have an open circuit voltage equal to any of the points of tangency, for example, the points B and B'. This latter characteristic is obtained by proper selection of the resistance value of the resistor SR1.

While this would be undesirable in a standard generator, it is an ideal characteristic for a regulating generator such as RS. The purpose of the control field windings RS7, RS5 and RS6 thus becomes that of locating the proper operating point of a series generator including the armature current energized and pattern fields RS1 to RS4, inclusive, and the armature winding, keeping this operating point constant for a given control condition with the regulating generator supplying the required amount of power to the generator field windings GSF1 and GSF2. With the speed control rheostat SR set at the desired position the electrical bridge circuit, and consequently the windings included in the legs of the bridge circuit, are energized with a current indicative of the desired speed of operation of the motor. Thus the four field windings RS1 to RS4 establish the pattern voltage for the speed regulating generator as well as imparting self-energizing properties thereto.

Since it is desired to regulate the speed of the motor M, an indication of the counter E. M. F. of the motor is desired. The magnitude of the motor counter E. M. F. is an indication of the extent of the departure in speed of the motor from the desired speed. An indication of the counter E. M. F. is obtained by differentially comparing the motor armature terminal voltage with the IR drop of the motor armature. This comparison takes place under running and creeping conditions between the differentially connected field RS7, which is energized according to the motor armature terminal voltage, and the field winding RS5, which is energized by the voltage drop across the generator commutating field winding GCF which carries the load current. The differential voltage resulting from this comparison, if matched by the pattern votage for running conditions of the field windings RS1 and RS4 of the speed regulating generator, indicates that the motor speed is correct for the setting of the speed rheostat SR. If the motor speed is low, the resulting differential voltage is low and no longer matches the pattern voltage. The speed regulating generator thus generates a voltage of sufficient magnitude which causes a current to circulate through the field windings in the bridge circuit in such a direction as to increase the electrical output of the main generator G to thus speed up the motor. As the motor increases in speed, the differential voltage eventually matches the pattern voltage at which point the electrical output of the speed regulating generator is maintained by the self-energizing properties thereof, thus maintaining the corrective current. If the motor speed should for any reason be in excess of that indicated by the speed controlling rheostat SR, the differential voltage overbalances the pattern voltage and reverses the electrical output of the speed regulating generator. This holds down the excitation of the main generator fields GSF1 and GSF2 since now the current circulated therethrough by the speed regulating generator is in opposition to that supplied to the bridge circuit through the speed controlling rheostat. The electrical quantity thus supplied to the motor drops and as a consequence the motor speed drops until the differential and pattern voltages are matched.

The current limiting regulating generator RCL in this application is not provided with armature current energized field windings such as the speed regulating generator. It is to be understood, however, that such fields may be used if desired. As shown, this machine functions substantially in the manner of a standard generator. Its special characteristics are illustrated graphically in Fig. 4. It is provided with three control field windings RCL1, RCL2 and RCL3 of which the windings RCL1 and RCL2 are not utilized when the motor is being operated at creeping speeds. The winding RCL1 is connected in series with the speed regulating rheostat SR by the contact members RR1 when the run contactor is energized, and thus under running conditions adds its ampere turns to those of the winding RCL2 to increase the excitation and consequently the electrical output of this machine. The field winding RCL3 being differentially connected with respect to RCL1 and RCL2 subtracts its ampere turns from these two windings.

Since it is desired to limit the current in the motor generator series armature circuit within a predetermined maximum value, some means must be provided for controlling the electrical output of the current limiting regulating generator RCL such that it is effective to limit the motor armature current as the predetermined maximum value is approached and at other times have no effect upon the systems. This is accomplished by means of the rectifier network including the resistors R9 and R10 and the rectifiers 6 and 7. The voltage drop across the resistor R9 for either running or creeping is opposed to the voltage generated by the current limiting generator. Currents produced by the voltage drop across the resistor R9 are prevented from circulating back through the armature of the current limiting generator by means of the rectifiers 6 and 7. These rectifiers are so disposed in the circuit that only the currents generated by the current limiting generator are circulated therethrough. Thus no current flows through this circuit during acceleration until the generated voltage exceeds the blocking voltage produced by the resistor R9. As a result, the speed regulating generator excitation of the field winding RS6 which is connected in series with the armature of the current limiting generator and the series resistor R8 is zero until the motor armature currents approach the selected maximum value. The effect of the field winding RS6 on the speed regulating generator tends to reverse the output of the speed regulating generator and it is effective under certain motor armature current conditions to completely reverse the output of the speed regulating generator. In any case its action is such as to reduce the excitation of the generator fields GSF1 and GSF2 to effect a drop in motor armature currents.

Figure 4:
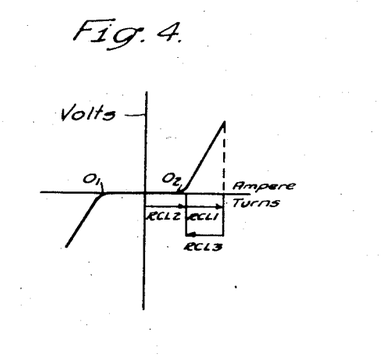
Fig. 4 is a curve graphically illustrating the operating characteristic of the other rotating regulator utilized in this invention.

The characteristic of the machine as a result of the resistor and rectifier network is clearly seen in Fig. 4 When the motor is operated at running speeds the RR relay is energized and consequently the field RCL2 which is the pattern field for the RCL generator is energized. Thus the excitation of this machine is increased. This immediately causes the RCL generator to produce a voltage of sufficient magnitude to overcome the blocking voltage which determines the points $O_1$ and $O_2$ which represent the ampere turns necessary to overcome the blocking voltage. As a result the winding R6 is energized in such a direction as to reduce the effective ampere turns of the speed regulating generator RS and if necessary reverse its electrical output to hold the starting currents down. As the motor accelerates the voltage across its motor armature terminals increases and as follows the excitation of the differential winding RCL3 increases and reduces the total ampere turns of the machine. This continues until the RCL2 and RCL3 fields are neutralized at which time the output of the current limiting generator drops to zero. The current field winding RCL2 might be used alone under running conditions to control the RCL generator, however, with such an arrangement the current in the motor armature circuit might overshoot safe values by a considerable margin before correction took place. With the preceding arrangement correction is initiated as these conditions are approached.

For creeping operation the winding RCL2 alone is sufficient since there is little, if any, possibility of the occurrence of dangerously high currents. Sufficient correction will take place for the short duration necessary by the action of the field RCL2.

The operation of the system for running speeds of the motor is as follows:

The exciter E, the current regulating limiting generator RCL, the speed regulating generator RS and the main generator G are first brought up to normal operating speed by the prime mover (not illustrated). The exciter voltage is thus applied across the motor field winding MF. As the exciter voltage builds up the relay FL is sufficiently energized that it may pick up and close its contact members FL1. With the master switch in the "off" position as shown, the low voltage relay LV is energized through a circuit across the positive and negative terminals indicated, which includes the contacts MS1 and MS2 of the master switch and the contact members FL1. When the LV relay picks up, its contact members LV1 and LV2 close. Pressing of the "reset" button, so designated in the drawings, connects the coil of the main contactor MC across the positive and negative terminals indicated. This contactor then moves to its energized position and closes its contact members MC, thereby completing the motor generator series armature circuit. Since the bridge circuit including the generator fields GSF1 and GSF2 is not yet connected across the exciter buses because the contacts CR4 and RR1 selectively completing this circuit are open, no current flows in the motor armature circuit. The contact members MC2 open and thus open the discharge circuit including the resistor R7 for the electrical bridge circuit. The contact members MC3 close and complete a partial energizing circuit for the coil of relay DFR. The contact members MC4 close and complete a holding circuit for the low voltage relay LV which also includes the contacts FL1 and LV1. Thus the master switch MS may be removed from its "off" position to either the "creep" or "run" positions without the low voltage relay being deenergized. The contact members MC5 close and shunt the "reset" button. Thus when the "reset" button is released and its contacts open, the coil of the main contactor remains energized through the "stop" push button which is normally closed and the now closed contacts MC5.

Operation of the master switch to the "run" position completes an energizing circuit through its contact members MS1 and MS4 and the contact members CR5 for the coil of the run contactor RC. This contactor picks up and closes its contact members RC1 to RC4, inclusive, shunting the field windings RS2 and RS3 and the associated resistors from the electrical bridge circuit. The back contact members RC5 open. The front contact members RC6 close and thus energize the conductor 5.

Energization of the conductor 5 energizes the coil of the differential field relay DF which picks up opening its contact members DF1, thus disconnecting the generator differential field GDF. The contact members DF2 close to complete a partial energizing circuit for the RR relay. When the contact members DF3 close, an energizing circuit for the relay AB is completed through the contact members LV2, DF3, the coil of the relay AB, the contact member CR6 and the master switch contacts MS4 and MS1. At the same time the DFR relay picks up through its connection with the now energized conductor 5 by means of the contacts MC3. This closes its contact members DFR1 and connects the armature of the speed regulating generator RS across the output terminals 3a and 4a of the electrical bridge.

When the AB relay picks up, its contact members AB1 open disconnecting the braking rheostat, and its contact members AB2 close inserting the accelerating rheostat in series with the resistor R12. Meanwhile, the relay 4A has been energized and its contact members 4A1 closed to shunt the resistor R12 through a circuit from the conductor 5, which includes the contact members 4AR1, 4RB1 to the coil of the relay 4A. The bridge circuit is, however, not yet connected since the RR relay is not energized. The contact members AB3 complete a holding circuit in parallel with the energizing circuit established in part by the contact members 4BR1 for the coil of the relay 4A. The contact members AB4, upon closing, connect the coil of the relay 1BR across the positive and negative terminals indicated and similarly energize through the yet closed contacts RR3, the coil of the relay 1AR. Both of these relays pick up. The relay 1AR opens its contact members 1AR1, opening the energizing circuit for the coil of the relay 1A, and closes its contact members 1AR2. Closing of the contacts 1AR2 energizes the coil of the relay 3AR. This relay thus opens its contacts 3AR1 to open the energizing circuit for the coil of the relay 3A and closes its contact members 3AR2 which energize the coil of the relay 4AR. Relay 4AR opens its contact members 4AR1 and closes its contacts 4AR2. Opening of the contact members 4AR1 disconnects the coil of the relay 4A from the conductor 5. The contact members 4A1 thus open and insert the resistor R12 in series with the accelerating rheostat AR and the contact members AR2 partially complete the energizing circuit for the run relay RR to start the motor. With this arrangement the current flow through the accelerating rheostat is low when the motor is being started. Thus the drop across the resistor R9 is decreased during the initial starting period which limits the current in the motor armature circuit to low values to limit the torque for starting purposes. As the motor accelerates and the various accelerating relays function, the accelerating rheostat circuit is recalibrated by shunting the resistor R12 in series therewith. The blocking potential for the current limiting generator across the resistor R9 is thus increased which correspondingly increases the maximum currents which may be attained in the motor armature circuit before the current limiting generator begins to function. This is permissible since the current limitation provided for the initial starting period is lower than that necessary to protect the system. Thus no damage to the system from excessive currents may result. The recalibrating which then occurs effectively increases the value of the maximum currents which may be attained to such limits that prolonged operation of the system just below this maximum value will in no way damage the system. Closure of the contact members 4AR2 completes an energizing circuit through the contact members 1BR3, which are now closed since the relay 1BR is energized, to the coil of the relay 3BR. This relay now closes its contact members 3BR1 and 3BR2. At the same time a circuit is completed through the contact members 1BR3 and 1BR2 to the coil of the relay 4BR. The relay 4BR opens its contacts 4BR1, which previously cooperate with the contacts 4AR1, to connect the coil of relay 4A to the conductor 5. Closure of the contact members 3BR1 and 3BR2 completes an energizing circuit for the run relay RR which includes the contact members AB4, 1AR2, 3AR2, 4AR2, 1BR3, 1BR2, 3BR1, 3BR2, the coil of the relay RR and the contact members DF2. This energizes the RR relay which then closes its contact members RR1 to connect the pattern field for the current limiting generator in series with the speed controlling rheostat SR and energize the bridge circuit. The motor accelerates with the resistors R12 and R13 in series with the accelerating rheostat AR. Thus a current flows through this field winding of a magnitude depending upon the setting of the speed rheostat SR. Closure of the contact members RR2 provides a holding circuit in conjunction with the contacts 3BR2 and DF2 for the coil of the relay RR. Opening of the contact members RR3 deenergizes the relay 1AR. This relay now closes its contact members 1AR1 after a short time interval and opens its contact members 1AR2. The relay 1A is now picked up to close its contact members 1A1 through a circuit which includes the contact members RR2 and the contact members 1AR1 and shunt the resistor R14 from the speed rheostat circuit. The motor thus increases in speed. The energizing circuit for the relay 3AR is open at the contact members 1AR2. After a short time interval this relay drops out and closes its contact members 3AR1 which, in conjunction with the yet closed contacts 1BR1, energizes the relay 3A which closes its contacts 3A1 and shunts the next resistor step R15 from the speed controlling rheostat circuit to further increase the motor speed. The contact members 3AR2 now being open deenergize the relay 4AR which after a short time interval drops out and again closes its contact members 4AR1. Since the contact members AB3 are closed, the coil of the relay 4A is again connected to the conductor 5. This relay now picks up and closes its contacts 4A1 to again shunt the resistor R12 to increase the drop across the resistor R9. Opening of the contact members 4AR2 does not deenergize the 3BR and 4BR relays since these relays are held in through the medium of the contact members RR2 and 3BR1.

As the voltage across the generator G and the voltage across the motor M build up, the relay 1VR first picks up and closes its contact members 1VR1. This energizes the timing relay TR which closes its contact members TR1 to complete an energizing circuit for the conductor 5 which is independent of the master switch position. When the motor approaches say 30% of maximum running speed the relay 2VR picks up, thus shunting the resistor R13 from its series relationship with the accelerating rheostat AR, thus further increasing the voltage across the resistor R9 and further increasing permissible motor armature currents. When the voltage across the generator armature terminals reaches a predetermined value the relay 3VR picks up and establishes a parallel energizing circuit for the coil of the relay TR. In a similar manner, once the voltage across the motor commutating field has reached a certain value the relay R picks up and establishes a third energizing circuit for the relay TR. The motor is thus accelerated to the speed selected by the setting of the speed rheostat SR and the generator fields GSF1 and GSF2 are additionally excited during this accelerating period by the speed regulating generator.

Should the currents existing in the motor armature circuit be sufficiently high, the excitation of the current limiting field winding RCL2 added to that of the winding RCL1 finally reaches a value such that the resulting ampere turns of the three windings produces a generated voltage which is greater than the opposed voltage or blocking potential of the resistor R9. The total excitation of the speed regulating generator RS is thus reduced to limit the current circulating in the motor generator armature circuit. Thus the motor is accelerated at the maximum permissible rate without the possibility of overloading the motor generator armature circuit.

Movement of the master switch to its "off" position immediately deenergizes the AB relay. This relay now closes its contact members AB1 and opens its contact members AB2, thereby disconnecting the accelerating rheostat AR and connecting the braking rheostat BR in series with the resistor R9. Since the relay 4BR is yet energized, opening of the contact members AB3 deenergizes the relay 4A which now inserts the resistor R12 in series with the braking rheostat and its series resistor R11. As a result the voltage across the resistor R9 is reduced and the current resulting from regeneration during braking periods of the motor reduced. The contact members AB4 deenergize the relay 1BR, which through the opening of the contact members 1BR1, deenergize the relay 3A to correspondingly decrease, through the insertion of the resistor R15 in series with the speed rheostat, the excitation of the main generator fields GSF1 and GSF2. This also reduces the pattern voltage of the speed regulating generator since the excitation of the self-energizing fields RS1 and RS4 is correspondingly decreased. Opening of the contact members 1BR2 deenergizes the relay 3BR which after a short time interval drops out opening its contact members 3BR1 and 3BR2. When contact members 3BR1 open, the relay 4BR is deenergized and closes its contact members 4BR1. This again causes the relay 4A to pick up since it is again connected to the conductor 5, and shunt the resistor R12 from its series connection with the braking rheostat to slightly increase the permissible current in the motor generator series armature circuit. Opening of the contact members 3BR2 deenergizes the coil of the relay RR. This relay drops out and opens its contact members RR1 and disconnects the bridge circuit from its supply of electrical energy. As the voltage across the motor and the generator decreases, the relays R, 1VR, 2VR, and 3VR drop out in a sequence which depends upon the nature of the voltage decrease. This eventually deenergizes the timing relay TR which opens its contact members TR1 which now provide the only source of electrical energy supply for the conductor 5. The relays DF and DFR therefore drop out and respectively connect the differential field GDF across the main generator to kill the residual voltage of this machine, and disconnect the speed regulating generator RS from the terminals 3a and 4a of the electrical bridge circuit. If at any time during the period of deceleration of the motor the regenerative currents in the motor armature circuit should rise above the established value, the current limiting regulating generator will limit the braking current. Under regenerative conditions the field winding RCL2 is reversely energized and the drop across the resistor R10 is, under this condition, effective to block the output of the current limiting generator. As the excitation of the field RCL2 increases, the generated voltage overbalances the blocking voltage and the field winding RS6 excites the speed regulating generator RS in such a manner that the electrical output of this machine tends to maintain the voltage of the main generator. The regenerative voltage is thus opposed by the voltage generated by the main generator and the currents in the motor armature circuit maintained within permissible values.

Operation of the master switch to the creep position energizes the coil of the creep relay CR through a circuit including the master switch contacts MS1 and MS5, the contact members RRC7 now closed, the coil of the relay CR, the contact members DF3 and the contact members LV2. The coils of the DF and DFR relays are energized from the conductor 5 which is now energized through the master switch contacts MS1 and MS3 and the back contacts RC5. When the creep relay picks up its contact members CR1 shunt the resistor R17 from its series connection with the winding RS5 of the speed regulating generator. This recalibrates the field winding which is excited according to the motor armature currents and in effect increases its sensitivity. In a similar manner the contact members CR2 shunt the differential field winding RCL3 and its series resistor R19 from the series connection with the field winding RS7. The differential field winding RS7 thus has the full motor armature terminal voltage applied thereacross. Since the run contactor RC is not energized during creeping operation of the motor, the windings RS2 and RS3 of the speed regulating generator, and their associated resistors, are connected in the electrical bridge circuit. This in effect increases the pattern voltage for a given excitation as well as the self-energizing properties of the machine. The contact members CR3, in conjunction with the contact members CR4, connect the speed controlling rheostat and its series connected resistor R14 to R16 across the exciter. The contact members CR3 function additionally to connect a portion of the resistor R16 across the input terminals of the electrical bridge circuit. This bridge circuit is thus excited in effect by the voltage drop across the mentioned portion of the resistor R16. A fine control of the exciting voltage supplied to the bridge is thus obtained and this voltage may be varied, depending upon the resistance of the speed controlling rheostat. In the instant case this resistance is a fixed value. The resistance, however, may be varied in any well known manner if desired. The contact members CR5 open the energizing circuit for the coil of the relay RC. The contact members CR6 open the energizing circuit for the relay AB. Since the contact members AB4 are open, the accelerating and braking relay system is not operable. Thus the motor is accelerated and operated with all the resistors R14 to R16 connected in series with the speed controlling rheostat SR. The contact members AB1, being closed, connect the braking rheostat BR in series with the resistors R12, R11, R9 and R10. The voltage drops across the resistors R9 and R10 in this case are controlled during accelerating and braking by the braking rheostat alone. Since the contact members RR1 of the run relay RR are open during creeping of the motor, the field RCL1 of the current limiting generator does not function. Hence the entire control of the current limiting generator is effected by the field RCL2. Since the creeping speed is so much lower than the running speed, that is, it is only about 1% or possibly slightly higher of the running speed, the accelerating and braking control previously described is unnecessary. The relay 1VR picks up initially and energizes the timing relay TR, thus establishing a second energizing circuit for the conductor 5. The relays R and 3VR pick up, respectively, when the motor commutator field and the generator terminal voltage is sufficient.

The variable voltage drive of this invention provides automatic overload current protection which results not in a time wasting shut-down of the system, but which limits the currents within permissible values, thereby providing maximum acceleration of the motor for the given mechanical load it is driving. Further, this automatic overload protection is provided by means of a simple small rotating regulator which requires a minimum of maintenance effort, and which for the most part eliminates the complicated relay or contactor systems which function in this capacity.

The foregoing disclosure and the showings made in the drawings are merely illustrative of the principles of this invention and are not to be interpreted in a limiting sense. The only limitations are to be determined from the scope of the appended claims.

We claim as our invention:

1. In a variable voltage drive, the combination of, a motor, a main generator for energizing the motor, field windings for the main generator, an electrical bridge circuit, means for supplying electrical energy to the electrical bridge circuit, certain of the field windings of the main generator being connected in opposite legs of the electrical bridge circuit such that the winding ampere turns in the opposite bridge legs are equal, a first regulating generator responsive to electrical quantities of the motor for controlling the excitation of said certain of the field windings, a second regulating generator responsive to motor armature currents for controlling the first regulating generator, and means for producing a voltage opposing the voltage generated by the second regulating generator to prevent the voltage generated by the second regulating generator from effecting the first regulating generator until the generated voltage exceeds the opposed voltage.

2. In a variable voltage drive the combination of, a motor, a main generator for energizing the motor, field windings for the main generator, an electrical bridge circuit, means for supplying electrical energy to the electrical bridge circuit, a field winding of the main generator connected in each of two opposite legs of the electrical bridge circuit, a first regulating generator responsive to electrical quantities of the motor, connected to circulate its output currents through the field windings of the main generator which are connected in the electrical bridge circuit, a field winding for the first regulating generator, a second regulating generator having an armature winding and a field winding, the armature winding of the second regulating generator being connected in series with the field winding of the first regulating generator, means for energizing the field winding of the second regulating generator in accordance with the currents in the armature of said motor, and means including a resistor and rectifier network for preventing the electrical output of the second regulating generator from circulating through the field winding of the first regulating generator until a predetermined motor armature current is reached.

3. In a variable voltage drive, the combination of, a motor, a main generator for supplying electrical energy to the motor, field windings for the main generator, an electrical bridge circuit, means for supplying electrical energy to the bridge circuit, a field winding of the main generator connected in each of two opposite legs of the bridge circuit, a first regulating generator having an armature winding and a group of field windings, circuit means connecting said armature winding of the regulating generator across the output terminals of the electrical bridge circuit, a pair of field windings of the first regulating generator being connected in series with each main generator field winding in opposite legs of the electrical bridge circuit, a second regulating generator having an armature winding and a control field winding, circuit means including a rectifier and resistor network connecting the armature winding of the second regulating generator in series with a field winding of the first regulating generator, means for supplying electrical energy to the rectifier and resistor network, circuit means connecting the field winding of the second regulating generator to be energized in accordance with the currents flowing through the armature of said motor.

4. In a variable voltage drive, the combination of, a motor having an armature winding and a field winding, a main generator having an armature winding and a pair of control field windings, circuit means connecting the armature winding of the main generator in series circuit relation with the armature winding of the motor, an electrical bridge circuit, each of said pair of field windings for the main generator being connected in an opposite leg of the electrical bridge circuit, means for supplying electrical energy to the electrical bridge circuit and to said motor field winding, a first regulating generator having an armature winding and seven field windings, circuit means connecting the armature winding of the first regulating generator across the output terminals of the electrical bridge circuit, four of said field windings for the first regulating generator being connected in the electrical bridge circuit, two in series with each main generator field winding, first control means for shunting a first regulating generator field winding from each of the opposite bridge circuit legs thus leaving one in series with each main generator field winding, a fifth first regulating generator field winding connected across the motor armature terminals, the fifth field winding being a differential field, a sixth field winding connected to be energized in accordance with the currents traversing the motor generator series armature circuit, a second regulating generator having an armature winding and a pair of control field windings, one of said control field windings for the second regulating generator being connected to be energized in accordance with the currents traversing the motor generator series armature circuit, second control means for connecting the other control field winding for the second regulating generator to be energized in accordance with the electrical energy supplied to the electrical bridge circuit, circuit means including a rectifier and resistor network connecting a seventh field winding of the first regulating generator in series with the armature winding of the second regulating generator, said rectifier and resistor network being connected to said means for supplying electrical energy and being operable to prevent an electrical output generated by the second regulating generator from circulating through said seventh field winding until said electrical output reaches a predetermined minimum value.

5. In a variable voltage drive, the combination of, a motor, a main generator for energizing the motor, a first regulating generator responsive to electrical quantities of the motor for controlling the electrical output of the main generator, a second regulating generator responsive to an electrical quantity of the motor for controlling the electrical output of the first regulating generator, and control means for decreasing the sensitivity of the first regulating generator while increasing the sensitivity of the second regulating generator to effect one speed of operation of the motor and for increasing the sensitivity of said first regulating generator while decreasing the sensitivity of second regulating generator for effecting another speed of operation of the motor.

6. In a variable voltage drive, the combination of, a motor, a main generator for energizing the motor, field winding means for the main generator, means for supplying electrical energy to said field winding means, a first regulating generator responsive to electrical quantities of the motor for controlling the excitation of the main generator field winding means, field winding means for the first regulating generator, a second regulating generator responsive to an electrical quantity of the motor for exciting a portion of the field winding means of the second regulating generator only when said electrical quantity of said motor to which said second regulating generator responds exceeds a predetermined value, field winding means for the second regulating generator, and control means for shunting certain portions of the field winding means of the first regulating generator while inserting certain portions of the field winding means of the second regulating generator to effect one speed of operation of the motor and for inserting said certain portions of the field winding means for the first regulating generator while disconnecting said certain portion of the field winding means for the second regulating generator to effect another speed of operation of the motor.

7. In a variable voltage drive, the combination of, a motor, having an armature winding and a field winding, a main generator having an armature winding and a pair of control field windings, circuit means connecting the armature windings of the main generator and motor in series circuit relationship, an electrical bridge circuit, each of said pair of field windings for the main generator being connected in an opposite leg of the electrical bridge circuit, means for supplying electrical energy to said electrical bridge circuit and to the motor field winding, a first regulating generator having an armature winding and seven field windings, a second regulating generator having an armature winding and three field windings, circuit means connecting the armature winding of the first regulating generator across the output terminals of the electrical bridge circuit, four of said field windings for the first regulating generator being connected in the electrical bridge circuit, two in series with each main generator field winding, first control means for shunting a first regulating generator field winding from each of the opposite bridge circuit legs thus leaving one in series with each main generator field winding, a fifth first regulating generator field winding connected in series with a first field winding of the second regulating generator across the motor armature terminals, the fifth field winding of the first regulating generator being a differential field, second control means for shunting the first field winding of the second regulating generator from its series connection with the said fifth field winding of the first regulating generator, a sixth field winding for the first regulating generator connected to be energized in accordance with the current traversing the motor generator series armature circuit, a second field winding of the second regulating generator being connected to be energized in accordance with currents traversing the motor generator series armature circuit, said first field winding for the second regulating generator being differentially connected with respect to said second field winding for the second regulating generator, third control means for connecting the third field winding for the second regulating generator to be energized in accordance with the electrical energy supplied to the electrical bridge circuit, circuit means including a rectifier and resistor network connecting a seventh field winding of the first regulating generator in series with the armature winding of the second regulating generator, said rectifier and resistor network being connected to said means for supplying electrical energy and being operable to prevent an electrical output of the second regulating generator from circulating through said seventh field winding until said electrical output reaches a predetermined value, and a master controller for selectively effecting operation of the first and third control means to obtain one motor speed and the second control means for another motor speed.

8. In a variable voltage drive the combination of, a motor, a generator for energizing the motor, first means for varying the speed of said motor, second means for maintaining the speed of said motor constant for any selected speed thereof, third means for limiting the motor current, fourth means for progressively controlling said third means for maintaining said motor current low during starting thereof and providing an increase thereof as said motor accelerates to the selected operating speed, and means for effectively minimizing the effect of said third means on said motor current over selected low speed ranges of said motor.

GEORGE E. KING.
WILLIAM H. FORMHALS.